United States Patent [19]

Miyazaki et al.

[11] Patent Number: 4,762,691

[45] Date of Patent: Aug. 9, 1988

[54] METHOD AND A DEVICE FOR EXTRACTING METAL IONS

[75] Inventors: Akira Miyazaki, Matsudo; Kenji Bansho, Ibaraki; Akira Kimura, Kashiwa; Hiroaki Tao, Ibaraki, all of Japan

[73] Assignee: Director General of Agency of Industrial Science and Technology, Japan

[21] Appl. No.: 24,715

[22] Filed: Mar. 11, 1987

[30] Foreign Application Priority Data

Mar. 17, 1986 [JP] Japan ................... 61-58959

[51] Int. Cl.$^4$ ............................................. B01D 11/04
[52] U.S. Cl. ........................................ 423/24; 423/54;
423/63; 423/87; 423/98; 423/109; 423/112;
423/139; 75/101 BE; 210/634
[58] Field of Search ..................... 423/24, 54, 64, 112,
423/157, 139, 417, 63, DIG. 14, 70, 87, 98, 109;
75/101 BE; 210/638, 688, 634

[56] References Cited

U.S. PATENT DOCUMENTS

| 3,067,008 | 12/1962 | Pilloton | 423/64 |
|---|---|---|---|
| 3,293,004 | 12/1966 | Musgrove et al. | 423/64 |
| 3,873,668 | 3/1975 | Melby | 423/139 |
| 3,941,793 | 3/1976 | Ackerley et al. | 423/24 |
| 3,983,208 | 9/1976 | Blay | 423/64 |
| 4,080,418 | 3/1978 | Carlberg | 423/DIG. 14 |
| 4,164,417 | 8/1979 | Gustison | 423/64 |
| 4,238,294 | 12/1980 | Takeuchi et al. | 423/DIG. 14 |
| 4,279,870 | 7/1981 | Natansohn et al. | 423/DIG. 14 |
| 4,567,284 | 1/1986 | Monzyk et al. | 556/146 |
| 4,664,700 | 5/1987 | Alexandratos | 423/DIG. 14 |

Primary Examiner—Anthony McFarlane
Attorney, Agent, or Firm—Lorusso & Loud

[57] ABSTRACT

Metal ions contained in trace in an aqueous solution are extracted, for quantitative analysis by an ICP emission spectrometer, with an organic solvent supplemented by chelate compounds in an extraction vessel having a thin cylindrical upper portion, to form an organic layer containing the extracted metal ions over an aqueous layer. After extraction, water is supplied from the bottom of the vessel in an amount so that the interface between the organic and aqueous layers is positioned at a predetermined position of the thin, upper portion where a liquid withdrawal port is provided. The organic layer is recovered from the withdrawal port.

3 Claims, 1 Drawing Sheet

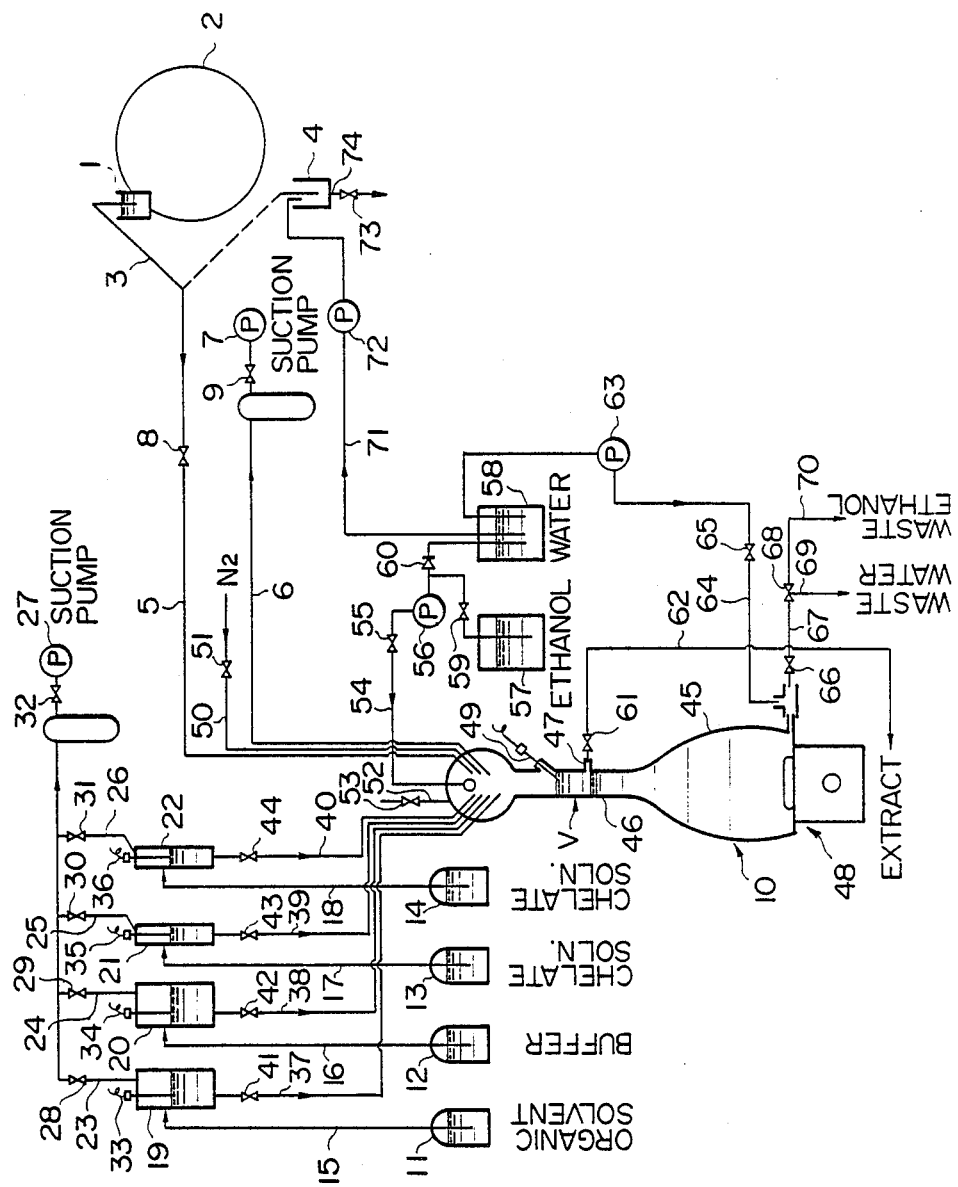

METHOD AND A DEVICE FOR EXTRACTING METAL IONS

BACKGROUND OF THE INVENTION

This invention relates to a method for automatically extracting metal ions contained in an aqueous solution with an extractant and to a device useful for carrying out the above method.

In order to quantitatively analyzing metal ions contained in trace amounts in an aqueous solution by an analyzer such as an inductively coupled plasma (ICP) emission spectrometer, it is necessary to concentrate the sample solution to a detecatable degree. One known concentration technique is extraction with an organic extractant. With known automatical extraction devices of a batch-type, however, it is difficult to obtain a highly concentrated sample because they require the use of a relatively large proportion of extractant.

SUMMARY OF THE INVENTION

The present invention contemplates the provision of a high efficiency method and device capable of automatically treating an aqueous solution containing trace amounts, generally about 10 μg or less, of metal ions with a small amount of extractant for extraction of the metal ions.

In accordance with one aspect of the present invention there is provided a method for extracting metal ions contained in an aqueous solution with an extractant including an organic solvent and capable of extracting the metal ions to form an upper organic phase containing the extracted metal ions and a lower aqueous phase containing the aqueous solution from which the metal ions have been extracted, said method comprising:

providing a vessel;

supplying a predetermined, first volume of the aqueous solution to said vessel;

supplying a predetermined, second volume of the extractant to said vessel;

said vessel including a lower, first portion having an inside volume larger than the total of said first and second volumes, and an upper, second portion having an inside diameter smaller than that of said first portion and a lower location, the inside volume of said second portion above said lower location being larger than the volume of the organic solvent contained in said second volume of the extractant;

stirring said aqueous solution and said extractant contained in said vessel to effect the extraction of the metal ions, so that an upper organic phase containing the extracted metal ions is formed above a lower aqueous phase containing the aqueous solution from which the metal ions have been extracted;

feeding a fluid immiscible with said organic phase to said vessel in an amount so that the interface between said organic and aqueous phases may be located adjacent to said lower location of said second portion; and recovering the liquid positioned above said lower location.

In another aspect, the present invention provides a device for extracting metal ions contained in an aqueous solution with an extractant including an organic solvent and capable of extracting the metal ions to form an upper organic phase containing the extracted metal ions and a lower aqueous phase containing the aqueous solution from which the metal ions have been extracted, comprising:

a vessel;

means for supplying a predetermined, first volume of the aqueous solution to said vessel;

means for supplying a predetermined, second volume of the extractant to said vessel;

said vessel including a lower, first portion having an inside volume larger than the total of said first and second volumes, and an upper, second portion having an inside diameter smaller than that of said first portion and a lower location, the inside volume of said second portion above said lower location being larger than the volume of the organic solvent contained in said second volume of the extractant;

means for stirring said aqueous solution and said extractant supplied to and contained in said vessel to effect the extraction of the metal ions;

means for feeding a fluid immiscible with said organic phase to said vessel in an amount so that the interface between said organic and aqueous phases may be located adjacent to said lower location of said second portion;

a recovery conduit means connected to said lower location of said second portion; and a discharge conduit means connected to the bottom of said vessel.

In the present invention, a combination of an organic solvent, a buffer solution and a chelating agent is preferably used as the extractant. The proportions of the organic solvent, buffer solution and a chelating agent in the extractant are preferably 15–45% by volume, 35–65% by volume and 10–30% by volume, respectively.

The organic solvent should be incompatible with an aquoues solution and have a density smaller than the aqueous solution so that, after extraction, there is formed an upper organic phase or layer containing extracted metal components above a lower aqueous phase or layer from which the metal ions have been extracted. Examples of suitable organic solvents include xylene and diisobutyl ketone.

The buffer solution may be, for example, an acetic buffer having a pH of $5.2 \pm 0.1$.

The chelating agent to be used in the present invention is preferably a combination of ammonium pyrolidinedithiocarbamate (APDC) and hexamethyleneammonium hexamethylenedithiocarbamate (HMAHMDC). The former carbamate is generally used in the form of an aqueous solution in the concentration of 1–3 wt %, while the latter carbamate is used in the form of a methanolic solution in the concentration of 1–3 wt %.

With the use of the above extractant it is possible to extract, substantially completely with only a single extraction, various metal ions such as ions of Cd, Co, Cr, Cu, Fe(II and III), Mn(II), Mo, Ni, Pb, V, Zn, In, Ga(III), Bi(III), Pd(II), Os(VIII), Ag, Au, Hg, Sn(II), Se(IV) and Te(IV).

In the present invention, the extractant and a sample solution to be treated are introduced into a vessel where they are mixed with each other to extract the metal ions contained in the sample solution with the extractant. The vessel has a lower portion having a volume sufficient to contain the extractant and the sample solution and an upper, elongated portion having a smaller diameter than that of the lower portion and provided with a liquid withdrawal port at a predetermined location.

After the completion of the extraction, water is fed from the bottom of the vessel in an amount so that the interface between the upper organic layer and the lower aqueous layer reaches adjacent to the liquid withdrawal port of the upper portion of the vessel. The upper organic layer is then withdrawn through the liquid withdrawing port while the remaining aqueous layer is discharged from the bottom of the vessel.

Since the organic layer is displaced to the thin, upper portion of the vessel before being withdrawn from the vessel, substantially all the organic layer can be recovered even if the amount of the organic solvent is small. More particularly, if the interface between the organic and aqueous phases is positioned by the addition of water at a level slightly lower than the predetermined location where the liquid withdrawal port is provided, that portion of the organic phase below the withdrawal port will be discharged without being recovered. However, due to the small inside diameter of the upper portion of the vessel, the amount of the unrecovered organic phase is so small as to permit the desired analysis of the metal ions. On the other hand, if the water is added excessively so that the interface is positioned above the withdrawal port, the organic phase recovered will contain that portion of the aqueous phase above the withdrawal port. However, the amount of the aqueous phase withdrawn together with the organic phase is so small that it does not adversely affect the succeeding analysis of the metal ions.

After the removal of the organic and aqueous phases from the vessel, the inside of the vessel is washed with suitable washing liquid or liquids such as water and ethanol for the preparation for the next extraction.

BRIEF DESCRIPTION OF THE DRAWINGS

The above and other objects, features and advantages of the present invention will become apparent from the detailed description of the invention to follow, when considered in the light of the accompanying drawings, in which:

the sole FIGURE is a schematic view diagrammatically showing one embodiment of extraction device according to the present invention.

DETAILED DESCRIPTION OF THE PREFERRED EMBODIMENTS OF THE INVENTION

Referring now to the FIGURE, the reference numeral 1 denotes a container containing a sample solution to be extraction-treated and placed in position on a turn table 2. The turn table supports thereon a number of containers (only one is shown) and is adapted to be rotated for positioning the containers one by one with a programmed interval at a sampling position. Provided adjacent to the sampling position is a sampling pipe 3 moveable between the sampling position (as shown by the solid line) and a washing position (as shown by the dotted line) by any suitable drive means (not shown). In the washing position, an end portion of the sampling pipe 3 is immersed into and washed with water in a vessel 4.

The sampling pipe 3 is connected through a line 5 having a valve 8 to a top portion of an extraction vessel generally designated as 10. A line 6 having a valve 9 extends between a top portion of the vessel 10 and a suction pipe 7. Thus, when the valves 8 and 9 are open positions, the sample solution in the container 1 is fed through the line 5 to the vessel by the suction force of the pump 7.

Designated as 11 through 14 are tanks containing an organic solvent, a buffer solution, a first chelate solution and a second chelate solution, respectively. The tanks 11–14 are connected by lines 15–18 to measuring vessels 19–22, respectively. The measuring vessels 19–22 are connected by lines 23–26 having valves 28–31, respectively, to a suction pump 27 via valve 32. The tanks 11–14 are provided with liquid level detectors 33–36. Thus, in the state where the valve 32 is opened, the organic solvent in the tank 11, for example, is supplied to the measuring vessel 19 when the valve 28 is opened. The feed of the organic solvent is continued until the detector 33 detects that the liquid level of the organic solvent in the vessel 19 reaches to a predetermined level. In the similar manner, predetermined volumes of the buffer and the first and second chelate solutions can be collected in the measuring vessels 20–22 by opening the valves 29–31. The bottoms of the measuring vessels 19–22 are connected by lines 37–39 via valves 41–44, respectively, to the above-mentioned extraction vessel 10. Thus, the predetermined amount of the liquid collected in each measuring vessel may be fed to the extraction vessel 10 by gravity or, if necessary, with the aid of the suction pump 7.

The extraction vessel 10 is composed of lower and upper portions 45 and 46. The upper portion is generally tubular in shape and has a sectional area smaller than that of the lower portion. Preferably, the upper portion 46 has a diameter in the range of 15–25 mm for the extraction treatment of the sample aqueous solution in an amount of 200–600 ml with the use of an organic solvent in an amount of 4–10 ml. The upper portion 46 of the vessel 10 is provided with a liquid withdrawing port 47 at a location so that the inside volume of the upper portion 46 above the withdrawing port 47 is greater than the volume of the organic solvent in the extractant to be supplied to the vessel 10, since that portion of the upper portion 46 above the withdrawing port 47 serves to act as a space in which the organic solvent is accommodated as described in detail hereinafter. The withdrawing port 47 is connected to a line 62 and a valve 61.

The lower portion 45 of the vessel has a shape suitable for performing therein mixing of the aqueous sample solution and the extractant and for effecting the extraction of metal components contained in the sample solution with the extractant. Thus, the lower portion should have an inside volume greater than the total volume of the sample solution and extractant, preferably by 1.2–3 times . In the particular example shown, the mixing is effected with a magnetic stirrer 48, so that the bottom of the lower portion 45 is designed to be flat. Other mixing methods such as a shaking method may be adopted if desired.

The upper portion 46 is provided with a liquid level sensor 49 capable of generating a detecting signal when the upper level of a liquid in the upper portion 46 is positioned at a predetermined level. The position of the sensor 49 is adjusted so that the volume of a liquid between the upper surface thereof and the withdrawal port 47 is substantially equal to the volume of the organic solvent used.

At the top of the vessel 10 is provided with ports connected to the lines 5, 6 and 37–40. In addition, the top portion of the vessel 10 has a port through which a gas such as nitrogen gas from a line 50 and a valve 51 is introduced in the vessel 10, a port through which the inside of the vessel 10 is in communication with the ambient air via line 52 and a valve 53, and a port through which a washing liquid is introduced from a line 54 and a valve 55 into the vessel 10. In the particular example shown, ethanol and water are used as the washing liquid. Thus, ethanol contained in a tank 57 and water contained in a tank 58 are selectively fed to the line 54 by means of a pump 56 and valves 59 and 60.

In the bottom of the vessel 10 is provided a port through which water in the tank 58 is supplied to the vessel 10 via pump 63, valve 65 and line 64 and a port through which a liquid in the vessel is discharged from the vessel 10 via valve 66 and line 67. The line 67 is connected to a valve 68 to selectively discharge aqueous liquid through a line 69 and ethanol through a line 70. Water in the tank 58 is also fed to the washing vessel 4 through a line 71 by a pump 72. The water in the vessel 4 is discharged therefrom through a line 73 and a valve 74.

The above extraction device operates as follows.

Before starting the operation, all the valves are closed. The suction pump 27 is turned on and the valve 32 is opened. Then the valves 28-31 are opened to introduce the organic solvent in the tank 11, buffer in the tank 12 and chelate solutions in the tanks 13 and 14 into the measuring vessels 19-26, respectively, through lines 15-18, respectively. The valves 28-31 are closed when the detectors 33-36 detect that liquid levels are positioned at predetermined levels, i.e. when predetermined amounts of the organic solvent, buffer and chelate solutions are collected in respective measuring vessels 19-22.

In the meantime, the sampling pipe 3 which has been washed with water in the washing vessel 4 is inserted into the container 1 and the valves 8 and 9 are opened while operating the suction pump 7. Thus, the sample solution in the container 1 is introduced into the vessel 10 through the line 5. Then, the valve 8 is closed and the valves 41-44 are opened so that entire amounts of the liquids in the measuring vessels 19-22 are supplied to the vessel 10 through lines 37-40. After the valves 41-44 were closed, the stirrer 48 is driven to mix the liquids contained in the vessel 10 and to effect the extraction.

After completion of the extraction, the valve 53 is opened and the mixed liquid in the tank is allowed to quiescently stand until the liquid is separated into an upper organic layer and a lower aqueous layer. It has been confirmed that the volume of the upper organic layer containing the extracted metal ions is substantially the same as the volume of the organic solvent used.

Then the valve 65 is opened and the pump 63 is driven to introduce water in that tank 58 into the vessel 10 through the line 64. The supply of the water is continued until the sensor 49 detects that the upper liquid level of the organic layer reaches to a predetermined level. Since the position of the sensor 49 is previously adjusted so that the inside volume of that portion (generally indicated as V) of the upper, small diameter portion 46 of the vessel 10 between the said predetermined level and the withdrawal port 47 is equal to the volume of the organic solvent used and since the volume of the organic layer containing extracted metal ions is substantially equal to the volume of the organic solvent used, the interface between the organic layer and the aqueous layer is located adjacent to the withdrawing port 47 when the supply of the water through the line 64 is stopped by closing the valve 65 in response to the detection of the sensor 49.

Then, the valve 53 is closed while the valves 51 and 61 are opened to withdraw the liquid positioned above the withdrawal port 47 (i. e. substantially the organic layer) from the vessel through the line 62. The thus withdrawn extract is fed to an autosampler (not shown) and the resultant samples are analyzed for the amounts of metal ions.

After the withdrawal of the organic layer through the port 47, the valve 61 is closed and the valve 66 is opened to discharge the liquid positioned below the port 47 (i. e. the aqueous layer) from the vessel 10. Water in the tank 58 is then fed to the vessel 10 via the valve 60, pump 56 and valve 55 and line 54 to wash the inside of the vessel and is discharged through the lines 67 and 69. Thereafter, ethanol in the tank 57 is supplied through the valve 59, pump 56, valve 55 and line 54 for washing the interior of the vessel 10 and is discharged through the valves 66, line 67, valve 68 and the line 70. The discharged ethanol may be recovered for reuse after refining.

In like manner, the sample solutions placed on the turn table 2 are successively fed to the extraction vessel 10 and the extracts are passed to an analyzer via autosampler. By providing two or more extraction vessels, it becomes possible to speed up the extraction treatment.

It will be understood that the extraction device described above may be automatically operated by actuating e valves, pumps, etc. by step-advance-type sequencer, though such a control device is not illustrated in the drawing.

The following example will further illustrate the present invention.

EXAMPLE

An aqueous solution (500 ml) containing Cd, Co, Cu Fe(III), Mn(II), Mo, Ni, Pb, V and Zn is subjected to the extraction treatment using the apparatus shown in the FIGURE. The extractant is composed of 10 ml of a 1M acetic acid/sodium acetate buffer (pH 5.2), 2 ml of an aqueous APDC solution (concentration: 2%), 2 ml of methanolic HMAHMDC solution (concentration: 2%) and 7 ml of xylene. The sample solution and the extractant are stirred in the vessel with a magnetic stirrer for 5 min and the mixture allowed to stand quiescently for 1 min. More than 6.9 ml of an organic phase is recovered and subjected to an analysis by an ICP emission spectrometer.

We claim:

1. A method for extracting metal ions contained in an aqueous solution with an extractant including an organic solvent and capable of extracting the metal ions to form an upper organic phase containing the extracted metal ions and a lower aqueous phase containing the aqueous solution from which the metal ions have been extracted, said method comprising:

providing a vessel, said vessel including a lower portion and an upper portion; said upper portion having an inside diameter smaller than that of said lower portion and a liquid withdrawal port defining a predetermined level in said upper portion;

supplying first volume of the aqueous solution to said vessel;

supplying a second volume of the extractant to said vessel, the volume of organic solvent in said second volume being less than the volume of said upper portion above said predetermined level and the total of said first and second volumes being smaller than the volume of said lower portion;

stirring said aqueous solution and said extractant contained in said vessel to effect the extraction of the metal ions, so that an upper organic phase containing the extracted metal ions is formed above a lower aqueous phase containing the aqueous solution from which the metal ions have been extracted;

feeding a fluid immiscible with said organic phase to said vessel in an amount so that the interface between said organic and aqueous phases is raised to a level which is adjacent said liquid withdrawal port, to enable withdrawal of said organic phase through said liquid withdrawal port; and withdrawing said organic phase through said liquid withdrawal port.

2. A method as claimed in claim 1, wherein said extractant includes xylene as said organic solvent, and acetic acid/sodium acetate buffer, and ammonium pyrolidinedithiocarbamate and hexamethyleneammonium hexamethylenedithiocarbamate.

3. A method as claimed in claim 1, wherein the ratio by volume of said organic solvent to said aqueous solution is from 1:20 to 1:150.

* * * * *

UNITED STATES PATENT AND TRADEMARK OFFICE
CERTIFICATE OF CORRECTION

PATENT NO. : 4,762,691

DATED : August 9, 1988

INVENTOR(S) : MIYAZAKI et al

It is certified that error appears in the above-identified patent and that said Letters Patent is hereby corrected as shown below:

Col. 1, line 10, delete "above";

line 11, "analyzing" should read --analyze--;

line 15, "detecatable" should read --detectable--.

Col. 3, line 7, "drawing" should read --drawal--;

line 34, delete "for the preparation" insert --to prepare--;

line 67, delete "pipe" insert --pump--;

line 68, delete "positions".

Col 4., line 11, delete "opened" insert --open--;

line 16, delete "to";

UNITED STATES PATENT AND TRADEMARK OFFICE
CERTIFICATE OF CORRECTION

PATENT NO. : 4,762,691

DATED : August 9, 1988

INVENTOR(S) : MIYAZAKI et al

It is certified that error appears in the above-identified patent and that said Letters Patent is hereby corrected as shown below:

line 17, delete "the" insert --a--;

line 32, delete "the sample aqueous" insert --an aqueous sample--;

lines 35, 37, 40 and 43, "withdrawing" should read --withdrawal--;

line 65, delete "At the" insert --The--.

Col. 5, line 43, delete "were" insert --are--;

line 48, delete "is separated" insert --separates--;

line 67, "withdrawing" should read --withdrawal--.

UNITED STATES PATENT AND TRADEMARK OFFICE
CERTIFICATE OF CORRECTION

PATENT NO. : 4,762,691            PAGE   3 of 3
DATED      : August 9, 1988
INVENTOR(S) : MIYAZAKI et al It is certified that error appears in the above-identified patent and that said Letters Patent is hereby corrected as shown below:

Col. 6, line 25, after "via" insert --the--;

line 30, delete "e" insert --the-- and after "by" insert --a--;

line 63, after "supplying" insert --a--.

Signed and Sealed this

Thirty-first Day of January, 1989

Attest:

DONALD J. QUIGG

Attesting Officer        Commissioner of Patents and Trademarks